United States Patent [19]

Simmons

[11] Patent Number: 5,000,584
[45] Date of Patent: Mar. 19, 1991

[54] BUSHING FOR OIL FILM BEARING

[75] Inventor: Thomas E. Simmons, Westborough, Mass.

[73] Assignee: Morgan Construction Company, Worcester, Mass.

[21] Appl. No.: 487,287

[22] Filed: Mar. 2, 1990

[51] Int. Cl.$^5$ .................. F16C 32/06; F16C 33/10
[52] U.S. Cl. ................................ 384/118; 384/114; 384/291; 384/322
[58] Field of Search ............... 384/100, 114–118, 384/120, 123, 283, 291, 293, 322, 397

[56] References Cited

U.S. PATENT DOCUMENTS

| 3,385,009 | 5/1968 | Lueders | 384/100 X |
| 3,386,783 | 6/1968 | Scheufler | 384/291 |
| 3,453,031 | 7/1969 | Rickley et al. | 384/118 |
| 3,761,149 | 9/1973 | Ferguson | 384/114 |
| 4,159,152 | 6/1979 | Bjork | 384/291 |

FOREIGN PATENT DOCUMENTS 3825449  6/1989  Fed. Rep. of Germany ...... 384/322

*Primary Examiner*—Thomas R. Hannon
*Attorney, Agent, or Firm*—Samuels, Gauthier & Stevens

[57] ABSTRACT

A bushing for an oil film bearing assembly has a plurality of hydrostatic oil recesses in its internal bearing surface at the load zone. Each recess is defined by the intersection of a double curved surface of revolution with the bearing surface, the recess thus being in the form of a portion of a prolate spheroid, with a substantially elliptical feathered peripheral edge.

10 Claims, 4 Drawing Sheets

BUSHING FOR OIL FILM BEARING

BACKGROUND OF THE INVENTION

1. Field Of The Invention

This invention relates to an improvement in oil film bearings of the type employed to rotatably support the journal surfaces of roll necks in a rolling mill.

2. Description of the Prior Art

In the typical rolling mill application of an oil film bearing, as depicted somewhat diagrammatically in FIGS. 1 and 2, the roll 10 has a neck section 12. The neck section 12 may be tapered, as shown, or it may be cylindrical. A sleeve 14 is received on the neck section 12 where it is rotatably fixed by means of one or more keys 13. The exterior of the sleeve defines the journal surface 16 of the roll neck. A bushing 18 has an internal bearing surface 20 surrounding and rotatably supporting the journal surface 16. The bushing is contained by and fixed within a chock 22. The chock is adapted to be supported in a roll housing (not shown), and is closed at the outboard end by an end plate 24 and cover 26. A seal assembly 28 is provided between the roll and the inboard end of the chock 22. The seal assembly functions to retain lubricating oil within the bearing while at the same time preventing contamination of the lubricating oil and inner bearing components by cooling water, mill scale, etc.

During normal operation of the mill, when the roll is rotating in the direction indicated by the arrow in FIG. 2 at speeds which are adequate for full hydrodynamic operation, a continuous flow of oil is fed through passageway 29 in the chock, feed openings 30 in the bushing and a rebore 32 in the bearing surface 20. From here, the oil enters between the bearing surface 20 and the rotating journal surface 16 to form a hydrodynamically-maintained oil film 34 at the bearing load zone "Z". The load zone is located on the side opposite to that of the load "L" being applied to the roll.

The oil ultimately escapes axially from between the journal and bearing surfaces 16,18 and is received in inboard and outboard sumps 36,38. From here, the oil is recirculated through filters, cooling devices, etc. (not shown) before being returned to the bearing.

If the rotational speed of the journal surface 16, the load L and the viscosity of the oil all remain within design limits, the bearing will continue to function satisfactorily, with an adequate oil film 34 being hydrodynamically maintained at the load zone Z. However, if one of these parameters should fall below its lower design limit, the hydrodynamically maintained oil film can deteriorate or collapse, causing metal to metal contact between the journal and bearing surfaces 16,20. If this should occur, the resulting friction will rapidly cause bearing failure.

Thus, from zero rotational speed at mill start up to the lower design limit for satisfactory hydrodynamic operation, the oil film 34 at the load zone Z must be created and maintained by means other than the hydrodynamic technique described above. To this end, and with reference additionallY to FIGS. 3-5, in the prior art conventional bearing assemblies, it is known to provide multiple hydrostatic recesses 40 in the bearing surface 20 at the load zone Z. The recesses 40 are interconnected by a network of passageways 42 to a positive displacement, constant volume high pressure oil pump 44.

As viewed radially from inside the bushing, the recesses 40 of the conventional prior art design are generally rectangular in configuration. The ends of the recesses are feathered as at 46, whereas the bottom 48 and side walls 50 are mutually perpendicular and thus define sharp bottom corners 52. The side walls 50 are perpendicular to the bearing surface 20 to thereby define sharp top edges 53.

With this type of arrangement, as the oil emerges from each recess 40 to hydrostatically form the oil film 34, it encounters very high resistance and thus experiences a significant pressure drop as it is forced in the axial direction between the sharp edges 53 and the bearing surface 20. The net result is that in order to maintain a given oil pressure in the film 34, a substantially higher oil pressure must be maintained in the recess 40. This in turn means that the pump 44 must work harder, and the entire lubrication system must be designed to operate at higher pressures.

It will also be seen that the oil emerging circumferentially from each recess 40 at its feathered ends 46 encountered significantly less resistance as compared to that encountered by the oil emerging axially past the sharp corners 53. This encourages circumferential flow at the expense of axial flow, which in turn adversely affects oil pressure field distribution throughout the load zone. The oil pressure field supports the load at the load zone.

Other disadvantages of the conventional design include high stress concentrations at the bottom corners 52, which can create cracks and cause bearing failure. Also, the sudden change in flow area at the sharp edges 53 results in relatively high fluid velocities, which in turn hasten metal erosion.

The objective of the present invention is to provide a bushing having novel and improved hydrostatic recess configurations which either avoid or at the very least, substantially minimize the problems associated with the prior art.

SUMMARY OF THE INVENTION

According to the present invention, there is provided an improved bushing having hydrostatic recesses which when viewed radially from inside the bushing, have substantially elliptical feathered peripheral edges. The major axes of the recesses extend transversely with respect to the bushing axis, whereas the minor axes of the recesses extend in parallel relationship to the bushing axis. The depth of each recess is non-uniform and increases gradually from its feathered peripheral edge to a maximum at the intersection of the major and minor recess axis.

Each hydrostatic recess of the present invention may be considered as defining a portion of a prolate spheroid produced by the intersection of a double curved surface of revolution with the internal bearing surface of the bushing. The double-curved surface of revolution is typically a torus having an axis of revolution surrounded by the bearing surface of the bushing and extending in parallel relationship to the longitudinal bushing axis.

BRIEF DESCRIPTION OF THE DRAWINGS

An embodiment of the invention will now be described by way of example only with reference to the accompanying drawings, wherein.

DETAILED DESCRIPTION OF ILLUSTRATED EMBODIMENT

Referring now to FIGS. 6-14, a bushing in accordance with the present invention is shown at 60. The bushing has a cylindrical inner bearing surface 62 with a pair of hydrostatic recesses 64 arranged symmetrically on opposite sides of the bearing center.

Figure 1:
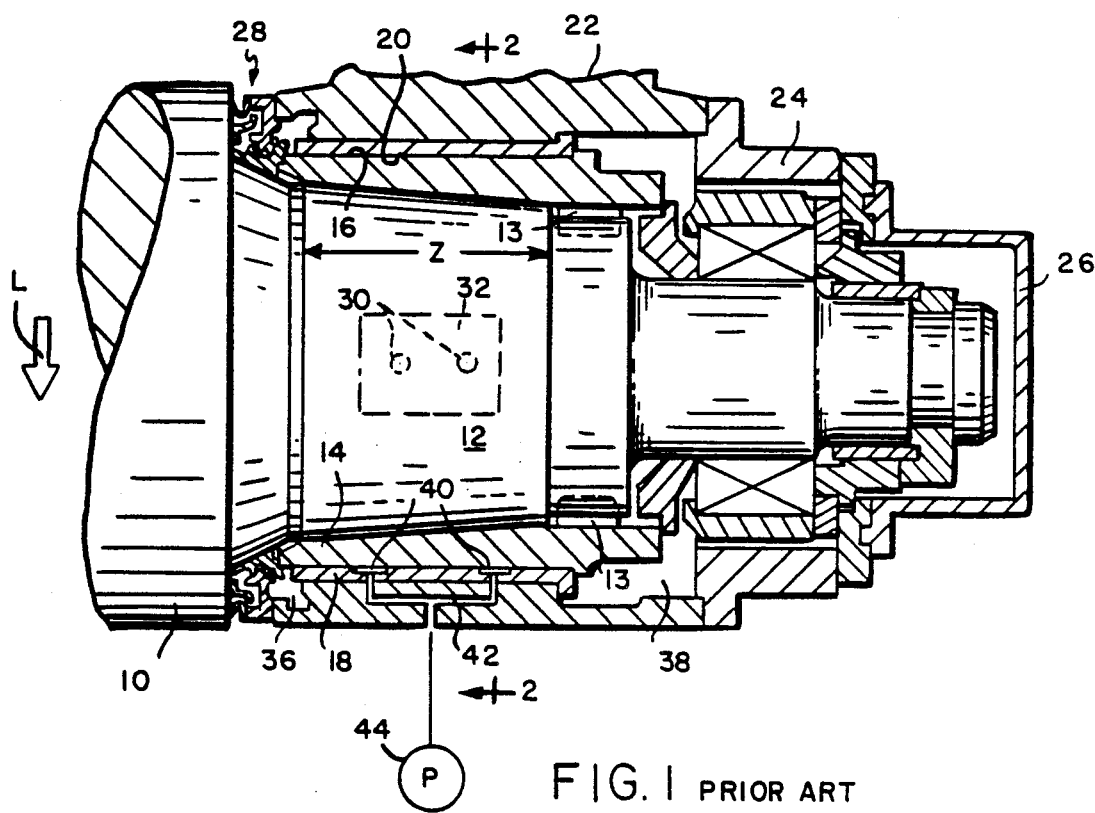
FIG. 1 is a longitudinal sectional view taken through an oil film bearing assembly which includes a bushing of conventional design.
Figure 2:
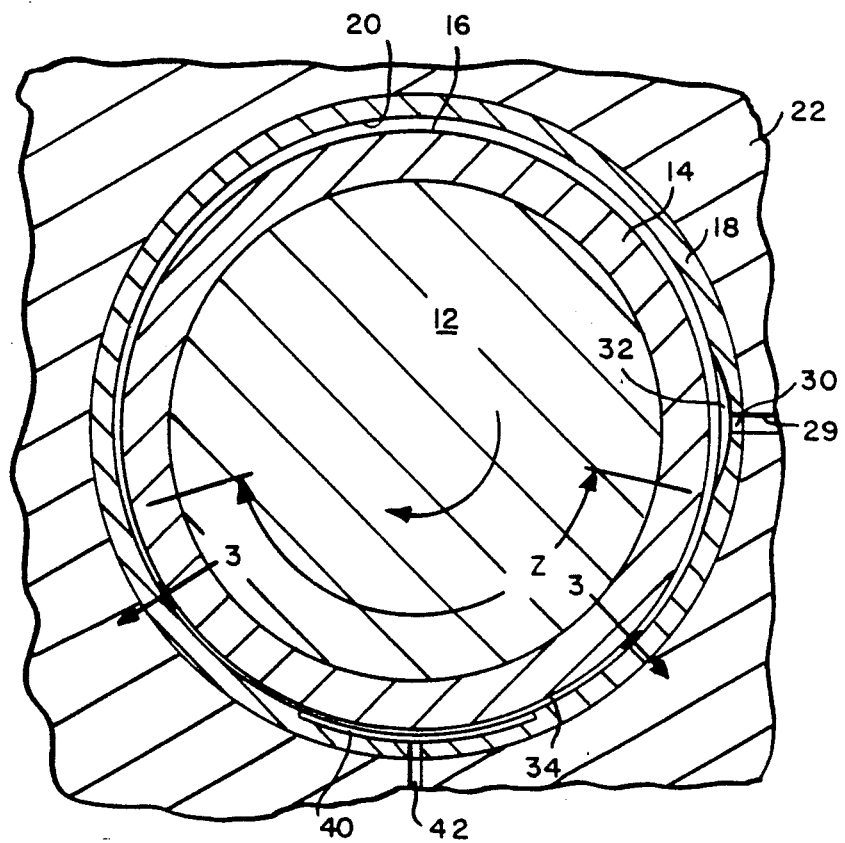
FIG. 2 is a cross sectional view on an enlarged scale taken along line 2—2 of FIG. 1.
Figure 3:
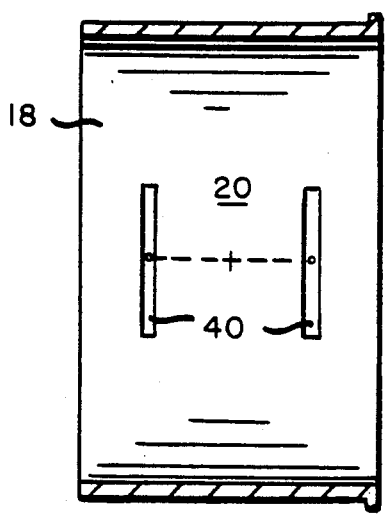
FIG. 3 is a sectional view taken along line 3—3 of FIG. 2.
Figure 4:
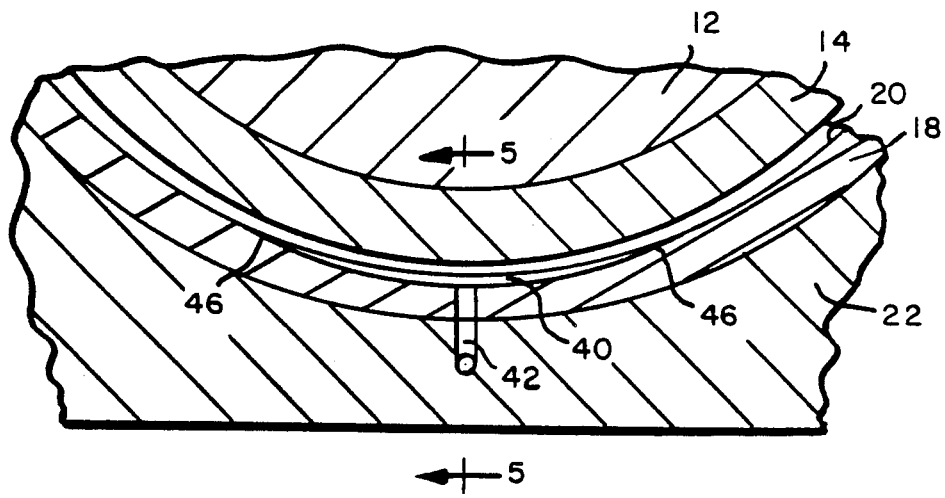
FIG. 4 is an enlarged view of a portion of the cross section illustrated in FIG. 2.
Figure 5:
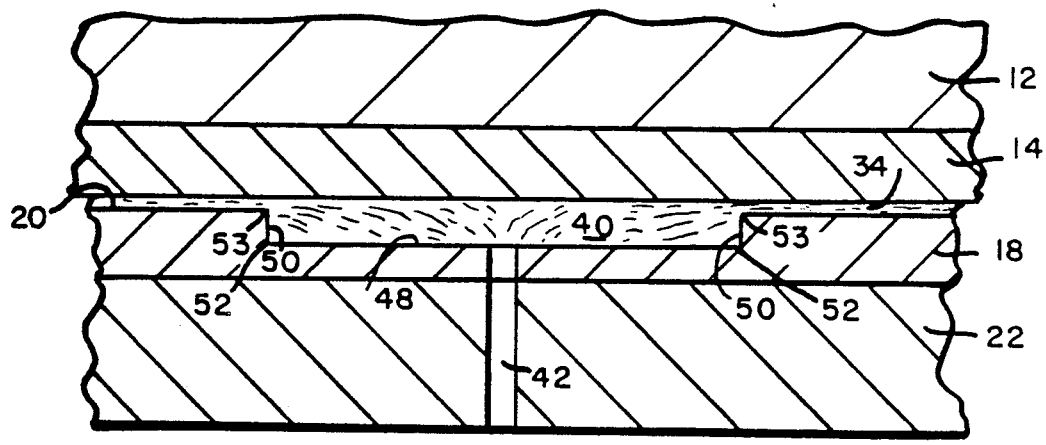
FIG. 5 is a cross section taken along line 5—5 of FIG. 4.
Figure 6:
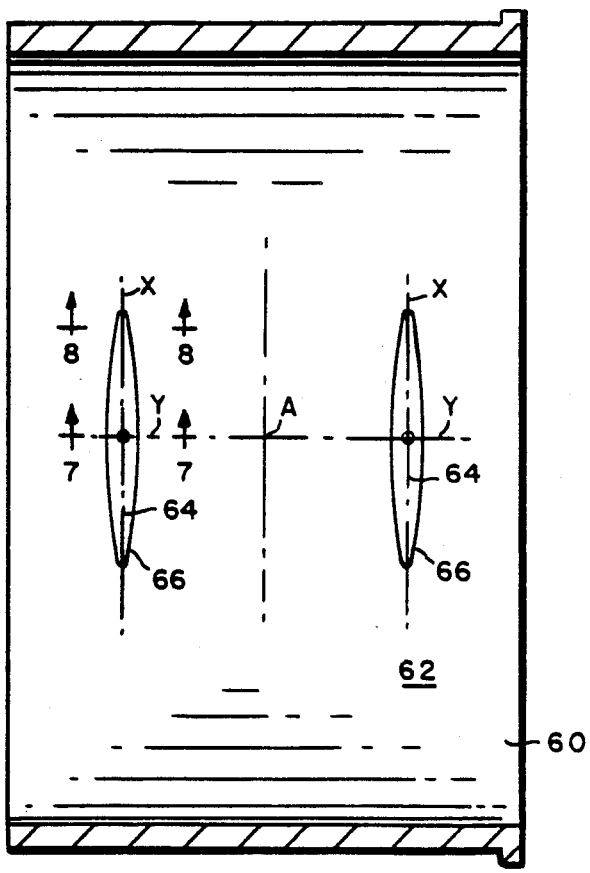
FIG. 6 is a view similar to FIG. 3, but on an enlarged scale and showing a bushing according to the present invention.

Each recess 64 is surrounded by a continuous feathered edge 66 which when viewed radially from inside the bushing (as shown in FIG. 6), is substantially elliptical in configuration with a major axis X extending transversally with respect to the longitudinal bushing axis A, and with a minor axis Y which extends in parallel relationship to axis A.

Figure 11:
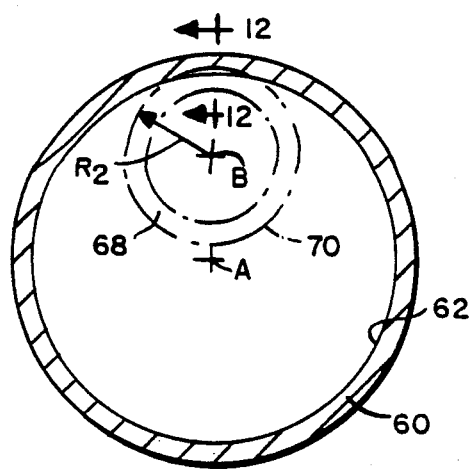
FIG. 11 is a schematic illustration of how the recesses of the present invention are developed at the interior bearing surface of the bushing.
Figure 12:
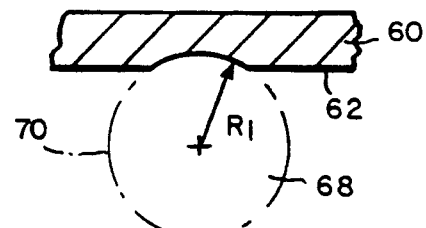
FIG. 12 is an enlarged view taken on line 12—12 of FIG. 11.

As illustrated in FIGS. 11 and 12, each recess 64 is defined by the intersection of a torus 68 with the internal bearing surface 62. The torus 68 is generated by the revolution of a plane curve 70 about an axis B. The curve 70, which in practice will constitute a cutting edge profile, has a radius $R_1$. The torus 68 has a radius $R_2$, with the axis B being located within and parallel to the bushing axis A.

Figure 7:
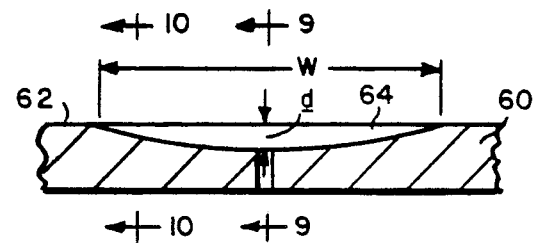
FIGS. 7 and 8 are sectional views on a greatly enlarged scale taken respectively along lines 7—7 and 8—8 of FIG. 6.
Figure 8:
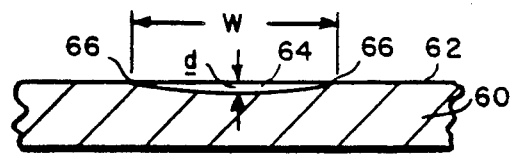
Figure 9:
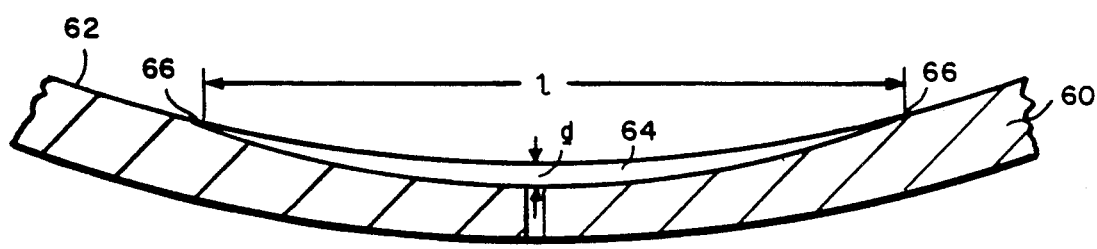
FIGS. 9 and 10 are sectional views taken respectively along lines 9—9 and 10—10 of FIG. 7.
Figure 10:
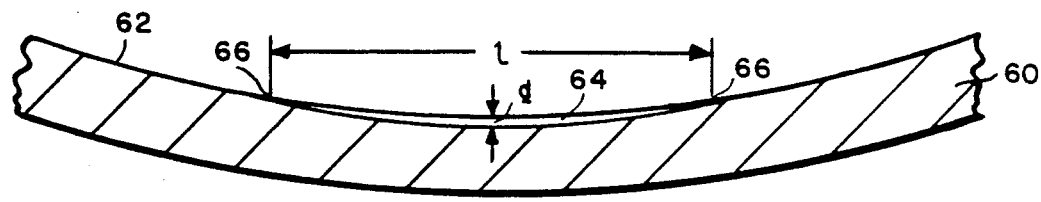

With reference to FIGS. 7 and 8, it will be seen that successive sections taken perpendicular to the major axis X will define segments of a circle each having the radius $R_1$. Progressing from the center of the recess towards its ends, each such segment has a gradually diminishing depth d and width w. By the same token, and with reference to FIGS. 9 and 10, successive sections taken perpendicular to the minor axis Y will define portions of a circle having the radius $R_2$. Again progressing from the center of the recess towards its sides, the successive portions have gradually diminishing depths d and lengths l. It follows, therefore, that each recess 64 defines a portion of a prolate spheroid.

Figure 13:
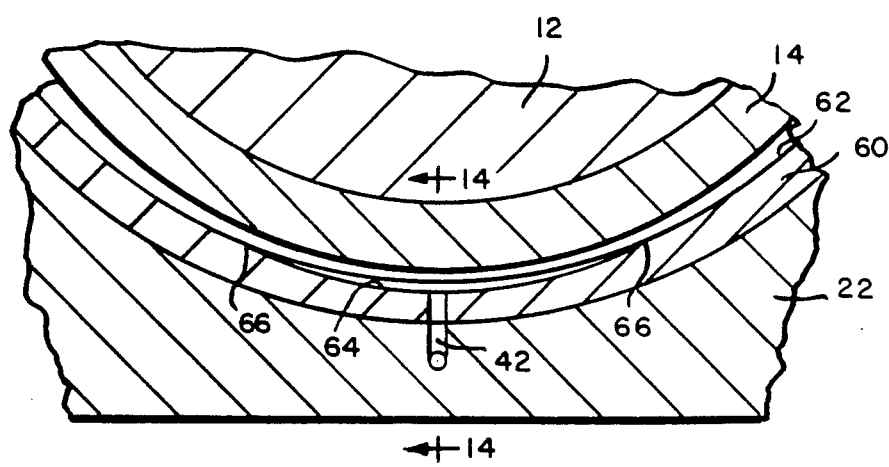
FIG. 13 is a view similar to FIG. 4 showing the bushing of the present invention installed in the bearing assembly.
Figure 14:
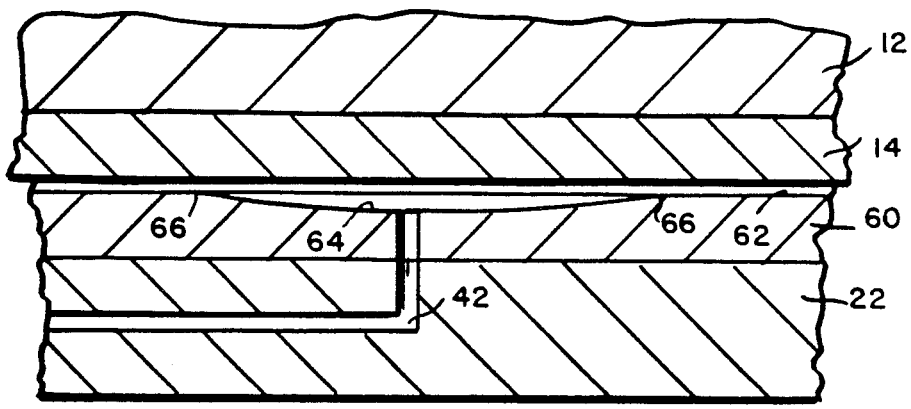
FIG. 14 is a sectional view taken along line 14—14 of FIG. 13.

FIGS. 13 and 14 illustrate the bushing of the present invention installed in an oil film bearing assembly. Instead of the sharp cornered side edges of the prior art recesses 40, the continuously feathered peripheral edge 66 of the recess 64 of the present invention accommodates a smoother, and lower velocity flow of axially emerging oil, with a significantly lower accompanying pressure drop. Thus, a lower oil pressure in the recess 64 is required to maintain a given pressure in the hydrostatically maintained film 34. Lower oil velocity reduces erosion of the recess edge 66, and elimination of sharp corners significantly reduces potentially damaging stress concentrations.

Also, the gradually diminishing circumferential flow path resulting from the diminished width w at the ends of the recess (compare FIGS. 7 and 8) resists circumferential flow and further encourages axial flow, thus improving oil distribution throughout the load zone.

I claim:

1. A bushing for use in an oil film bearing assembly of the type employed to rotatably support the journal surface of a rolling mill roll neck, said bushing comprising:

a wall having an inner cylindrical bearing surface adapted to surround said journal surface;

conduit means extending through said wall for conveying liquid lubricant under pressure to a load zone between said bearing surface and said journal surface; and at least one recess in said bearing surface in communication with said conduit means for receiving the thus conveyed lubricant under pressure and for distributing the same in said load zone in the form of a lubricant film separating said journal surface from said bearing surface, said recess being defined by the intersection of a double-curved surface of revolution with said bearing surface.

2. The bushing of claim 1 wherein said double-curved surface of revolution is a torus.

3. The bushing of claim 2 wherein the rotational axis of said double-curved surface is parallel to the longitudinal axis of said bushing and surrounded by said bearing surface.

4. The bushing of claim 3 wherein the radius of rotation of said double-curved surface of revolution is smaller than the radius of said bearing surface.

5. The bushing of claim 1 wherein said recess defines a portion of a prolate spheroid.

6. The bushing of claim 1 wherein said recess has a substantially elliptical peripheral edge.

7. The bushing of claim 6 wherein said recess has a major axis extending in a direction perpendicular to the longitudinal bushing axis, and a minor axis extending in a direction parallel to the longitudinal bushing axis.

8. The bushing of claim 7 wherein cross sections taken through said recess in directions perpendicular to said major axis define segments of circles.

9. The bushing of either claim 7 or 8 wherein cross sections taken through said recess in directions perpendicular to said minor axis define portions of circles.

10. A bushing for use in an oil film bearing assembly of the type employed to rotatably support the journal surface of a rolling mill roll neck, said bushing comprising:

a wall having an inner cylindrical bearing surface adapted to surround said journal surface;

conduit means extending through said wall for conveying liquid lubricant under pressure to a load zone between said bearing surface and said journal surface; and a plurality of recesses in said bearing surface in communication with said conduit means for receiving the thus conveyed lubricant and for distributing the same in said load zone in the form of a lubricant film separating said journal surface from said bearing surface, said recesses being arranged symmetrically with respect to the center of said load zone, each of said recesses having a major axis extending in a direction perpendicular to the longitudinal bushing axis and a minor axis extending in a direction parallel to the longitudinal bushing axis, each of said recesses having a substantially elliptical peripheral edge and a non-uniform depth increasing gradually from said edge to a maximum depth at the intersection of said major and minor axes.

* * * * *